(12) United States Patent
Fukuda

(10) Patent No.: US 7,986,234 B2
(45) Date of Patent: Jul. 26, 2011

(54) WIRELESS COMMUNICATION SYSTEM AND WIRELESS COMMUNICATION APPARATUS

(75) Inventor: Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 963 days.

(21) Appl. No.: 10/567,622

(22) PCT Filed: Aug. 4, 2004

(86) PCT No.: PCT/JP2004/011161
§ 371 (c)(1),
(2), (4) Date: Sep. 21, 2006

(87) PCT Pub. No.: WO2005/015764
PCT Pub. Date: Feb. 17, 2005

(65) Prior Publication Data
US 2007/0024444 A1 Feb. 1, 2007

(30) Foreign Application Priority Data
Aug. 11, 2003 (JP) ................ P2003-291809

(51) Int. Cl.
*G08B 13/14* (2006.01)
(52) U.S. Cl. ............ 340/572.1; 340/10.1; 340/5.61; 340/7.22
(58) Field of Classification Search ............ 340/10.1, 340/572.1, 5.61, 7.22; 455/41
See application file for complete search history.

(56) References Cited

U.S. PATENT DOCUMENTS

| | | | |
|---|---|---|---|
| 5,326,746 A * | 7/1994 | Ohtani et al. | 505/330 |
| 5,671,254 A * | 9/1997 | Nagata et al. | 375/326 |
| 5,781,106 A | 7/1998 | Liger | |
| 5,940,006 A * | 8/1999 | MacLellan et al. | 370/314 |
| 6,122,329 A * | 9/2000 | Zai et al. | 375/329 |
| 6,223,990 B1 * | 5/2001 | Kamei | 235/492 |
| 6,262,767 B1 * | 7/2001 | Wakui | 348/211.99 |

(Continued)

FOREIGN PATENT DOCUMENTS

EP 0 430 291 A2 6/1991

(Continued)

OTHER PUBLICATIONS

Ville Kaajakari, Ari Alastalo, Kaarle Jaakkola, and Heikki Seppa, Variable Antenna Load for Transmitter Efficiency Improvement, IEEE Transactions on Microwave Theory and Techniques vol. 55 No. 8, Aug. 2007, abstract.*

(Continued)

*Primary Examiner* — Benjamin C Lee
*Assistant Examiner* — Quang Pham
(74) *Attorney, Agent, or Firm* — Lerner, David, Littenberg, Krumholz & Mentlik, LLP

(57) ABSTRACT

A low consumption power is realized in a communication type that a ratio of transmission between apparatus limited to a relatively short distance occupies most of communications. Upon reception of transmission data constituted of a bit series, a wireless transmission module unit performs an on/off operation of an antenna switch connected to an antenna, in accordance with a bit image of the transmission data, and transmits, by a back scattering scheme, the transmission data as reflected radio waves of radio waves from a transmission destination generated by a change in an antenna load impedance. The antenna switch is generally made of a gallium arsenide IC, its consumption power is several 10 μW or less, and it becomes possible to realize ultra low consumption wireless image transmission.

8 Claims, 6 Drawing Sheets

U.S. PATENT DOCUMENTS

| | | | |
|---|---|---|---|
| 6,351,645 B1* | 2/2002 | Suzuki et al. | 455/458 |
| 6,400,903 B1* | 6/2002 | Conoval | 396/56 |
| 6,408,095 B1* | 6/2002 | Maeda et al. | 382/232 |
| 6,545,709 B2* | 4/2003 | Takei et al. | 348/222.1 |
| 6,686,829 B1* | 2/2004 | Hohberger et al. | 340/10.1 |
| 6,720,866 B1* | 4/2004 | Sorrells et al. | 340/10.4 |
| 7,019,639 B2* | 3/2006 | Stilp | 340/531 |
| 7,065,328 B1 | 6/2006 | Forster et al. | |
| 7,110,755 B2* | 9/2006 | Shibasaki et al. | 455/420 |
| 7,277,681 B2* | 10/2007 | Saito | 455/108 |
| 7,280,851 B2* | 10/2007 | Oba et al. | 455/566 |
| 7,304,682 B2* | 12/2007 | Nihei et al. | 348/362 |
| 7,315,522 B2* | 1/2008 | Wood, Jr. | 370/312 |
| 7,362,371 B1* | 4/2008 | Tanaka et al. | 348/373 |
| 7,391,967 B2* | 6/2008 | Shizukuishi | 396/321 |
| 7,443,420 B2* | 10/2008 | Maeda | 348/207.2 |
| 7,717,349 B2* | 5/2010 | Akiyama et al. | 235/492 |
| 2001/0001758 A1* | 5/2001 | Greeff et al. | 455/41 |
| 2001/0007335 A1* | 7/2001 | Tuttle et al. | 235/492 |
| 2001/0055373 A1* | 12/2001 | Yamashita | 379/90.01 |
| 2002/0065576 A1* | 5/2002 | Beaucour | 700/225 |
| 2002/0090910 A1* | 7/2002 | Takemura | 455/3.05 |
| 2002/0101619 A1* | 8/2002 | Tsubaki et al. | 358/302 |
| 2002/0127019 A1* | 9/2002 | Ogasawara | 396/661 |
| 2002/0154221 A1* | 10/2002 | Ishimaru | 348/207.1 |
| 2002/0174337 A1 | 11/2002 | Aihara | |
| 2003/0036397 A1* | 2/2003 | Takahashi | 455/502 |
| 2003/0103144 A1* | 6/2003 | Sesek et al. | 348/207.1 |
| 2003/0104848 A1* | 6/2003 | Brideglall | 455/574 |
| 2004/0183918 A1* | 9/2004 | Squilla et al. | 348/211.2 |
| 2007/0018793 A1* | 1/2007 | Stewart et al. | 340/10.3 |
| 2008/0239083 A1* | 10/2008 | Kusaka et al. | 348/207.1 |

FOREIGN PATENT DOCUMENTS

| | | |
|---|---|---|
| EP | 0 430 291 A2 | 6/1991 |
| EP | 1 001 348 A2 | 5/2000 |
| EP | 1 001 348 A2 | 5/2000 |
| JP | 7-202556 A | 8/1995 |
| JP | 10-506070 A | 6/1998 |
| JP | 11-120305 A | 4/1999 |
| JP | 2000-078055 A | 3/2000 |
| JP | 2001-339327 A | 12/2001 |
| JP | 2002-318999 A | 10/2002 |
| JP | 2002-535874 T | 10/2002 |
| JP | 2003-502977 T | 1/2003 |
| JP | 2003-069935 A | 3/2003 |
| JP | 2004-120263 A | 4/2004 |
| WO | 00/42721 A1 | 7/2000 |

OTHER PUBLICATIONS

International Standard ISO/IEC 8802-11:1999 (E) ANSI/IEEEStd802.11, 1999 Edition, Part 11:WirelessLANMediumAccess Control (MAC) and Physical Layer (PHY) Specifications, Jan. 20, 2000.

Finkenzeller K: "RFID-Handbuch, Grundlagen und praktische Anwendungen indukitver Funkanlagen, Transponder und kontaktloser Chipkarten" RFID Handbook: Grundlagen Und Praktische Anwendungen, XX, XX, 2002, pp. 29-61, XP002350424.

Finkenzeller, Klaus: "RFID-Handbuch, Grundlagen und praktsiche Anwendungen induktiver Funkanlagen, Transponder und kontaktloser Chipkarten" Sep, 26, 2002, Hanser Verlag, Muchnen, Wien, XP002445050 ISBN: 3-446-22071-2, pp. 319-339.

* cited by examiner

WIRELESS COMMUNICATION SYSTEM AND WIRELESS COMMUNICATION APPARATUS

TECHNICAL FIELD

The present invention relates to a wireless communication system and wireless communication apparatus with a radio wave communication scheme using micro waves in a specific frequency band, and more particularly to a wireless communication system and wireless communication apparatus for wireless transmission of image data from a portable apparatus such as a digital camera and a mobile phone to an apparatus such as a PC, a television and a printer.

More specifically, the present invention relates to a wireless communication system and wireless communication apparatus realizing a low consumption power for wireless transmission of image data from a portable apparatus such as a digital camera and a mobile phone to an apparatus such as a PC, a television and a printer, and more particularly to a wireless communication system and wireless communication apparatus realizing a low consumption power in a communication state that a ratio of transmission between apparatus limited to a relatively short distance occupies most of communications.

BACKGROUND ART

A wireless LAN has been paid attention as a system which releases users from LAN wirings of a cable scheme. Since the wireless LAN can omit almost all wired cables in a work space such as an office, communication terminals such as personal computers (PC) can be moved relatively easily. Introducing a personal area network (PAN) among others has been studied for information communications by configuring a small scale wireless network of a plurality of electronic apparatus existing around persons. For example, different wireless communication systems and wireless communication apparatus have been prescribed which utilize frequency bands whose licenses by a supervisory office are not necessary, such as a 2.4 GHz band and a 5 GHz band.

Wireless LANs are recently prevailing considerably, because a wireless LAN system becomes inexpensive and is built in PC as a standard. A wireless LAN function in the form of a built-in or external connection adapter is being mounted on a portable apparatus such as a mobile phone and a video camera, in addition to information apparatus such as a PC and a PDA. An example of applications is to upload image data taken with a mobile phone having a camera or a digital camera to a PC via a wireless LAN.

FIG. 5 shows an example of image transmission in a conventional wireless LAN. In FIG. 5, a mobile apparatus is assumed to be a digital camera 100.

A wireless LAN card 101 is mounted on the digital camera 100. The wireless LAN module 101 mounted on a mobile apparatus of this kind is supplied generally in the form of a PC card interface, a compact flash interface or the like. There is a plurality of wireless LAN standards. Many mobile series adopt the standards called 802.11b standardized by IEEE (Institute of Electrical and Electronic Engineers). IEEE802.11b is the wireless LAN standards using a 2.4 GHz band, adopting a DS-SS (Direct Sequence Spectrum Spread) as a modulation scheme, and having a maximum transmission rate of 11 Mbps (for example, refer to Non-Patent Document 1). For example, CSMA/CA (Carrier Sense Multiple Access with Collision Avoidance) is used as an access control method for IEEE802.11b.

The digital camera 100 stores a photographed image in a built-in memory or an external memory card as image data. For wireless transmission, objective image data is read from the built-in memory or external memory card, and transferred to an image reproducing apparatus such as a PC 102, a television 104 and a printer 106 via the wireless LAN module 101. Obviously, receiving apparatuses side such as the PC 102, the television 104 and the printer 106 are equipped with wireless LAN modules 103, 105 and 107 as adapters. After image data transfer through the wireless LAN, the PC 102 displays and stores the image data, the television 104 displays and outputs it on the screen, and the printer 106 prints and outputs it.

FIG. 6 schematically shows the structure of a conventional digital camera having a wireless LAN function. Reference numeral 200 represents a digital camera having a wireless LAN function. A digital camera itself is constituted of a camera unit 202, a signal processing unit 203, a memory card interface unit 204, an operation/display unit 205 and a USB (Universal Serial Bus) interface unit 206.

The signal processing unit 203 converts image data input from the camera unit 202 into image data having a predetermined format such as JPEG (Joint Photographic Experts Group) and stores the image data in an external memory card 207 via the memory card interface unit 204.

The operation/display unit 205 performs image display, various settings and the like. The USB interface unit 206 is used for image transfer to PC by using a USB Interface.

Reference numeral 201 represents a wireless LAN module and is constituted of a wireless LAN unit 208 and an antenna 209. For image transfer using a wires LAN, the wireless LAN unit 208 receives image data read from the memory card 207 by the signal processing unit 203 and transfers the image data to a display apparatus side via the antenna 209.

There arises a problem of a consumption power when a wireless LAN is mounted on a portable apparatus such as a digital camera and a mobile phone. Most of wireless LAN cards of IEEE802.11b presently sold commercially have a consumption power of 800 mW or more for transmission and 600 mW or more for reception. This consumption power is a large load on a battery driven portable apparatus.

The consumption power can be lowered only by 80% even if a wireless LAN function is operated by limiting to a short distance and reducing a transmission power. Particularly, transfer from an image input apparatus such as a digital camera to an image display apparatus has a communication type that a transmission ratio occupies most of communications. Accordingly, there is a demand for means of wireless transmission with low consumption power.

[Non-Patent Document 1]
International Standard ISO/IEC 8802-11:1999 (E) ANSI/IEEE Std 802.11, 1999 Edition, Part 11:Wireless LAN Medium Access Control (MAC) and Physical Layer (PHY) Specifications

DISCLOSURE OF INVENTION

Problem to be Solved by the Invention

An object of the present invention is to provide an excellent wireless communication system and wireless communication apparatus capable of proper wireless transmission of image data from a portable apparatus such as a digital camera and a mobile phone to an apparatus such as a PC, a television and a printer.

Another object of the present invention is to provide an excellent wireless communication system and wireless communication apparatus capable of realizing a low consumption power for wireless transmission of image data from a portable apparatus such as a digital camera and a mobile phone to an apparatus such as a PC, a television and a printer.

Still another object of the present invention is to provide an excellent wireless communication system and wireless communication apparatus capable of realizing a low consumption power in a communication type that a ratio of transmission between apparatus limited to a relatively short distance occupies most of communications.

Means for Solving the Problem

The present invention has been made in consideration of the above-described issues and provides a wireless communication system for data transmission by radio waves between a data supply source apparatus and a data provided destination apparatus. The wireless communication system is characterized in that: the data supply source apparatus has an RFID (Radio Frequency Identification) tag function that transmits data by a back scattering scheme by absorbing or reflecting external radio waves in accordance with a bit string of the data through an on/off control of an antenna switch to make an antenna in a terminated state or an open state, and the data provided destination apparatus has a reader function that transmits a carrier in a predetermined frequency band and reads data of an RFID tag in accordance with reflected waves; and the data provided destination apparatus transmits a non-modulated carrier or a modulated control signal, and the data supply source apparatus transmits data by absorbing or reflecting external radio waves on a basis of termination control of the antenna and the data provided destination apparatus receives the data on a basis of presence/absence of reflected waves from the supply source apparatus.

The term "system" herein used means a substance of a logical collection of a plurality of apparatus (or functional modules realizing specific functions), irrespective of whether each apparatus and functional module exists in a single housing.

The data supply source apparatus is a battery-driven type mobile apparatus equipped with a camera function and a function of photographing a moving image or a still image, such as a digital camera and a mobile phone having a camera function. On the other hand, the data provided destination apparatus is, for example, a personal computer, a television or other display apparatus, and can display or reproduce and store image data received from a digital camera or a mobile phone having a camera function.

The wireless communication system of the present invention aims to realize a low consumption power in a communication type that a ratio of transmission between apparatus limited to a relatively short distance occupies most of communications, and wireless communication is conducted by utilizing reflected waves on the basis of a back scattering scheme used by RFID. An RFID system itself is widely known to those skilled in the art as an example of a wireless communication means capable of being applied only to a relatively short distance.

The wireless communication apparatus as a data supply source uses an RFID tag based on a radio wave communication scheme, as a wireless transmission module, in place of a conventional wireless LAN module. The wireless transmission module has an antenna, an antenna switch and an antenna load.

Upon reception of transmission data made of a bit series, the wireless transmission module unit performs an on/off operation of the antenna switch connected to the antenna in accordance with a bit image of the data. For example, if data is "1", the antenna switch 310 is turned on, whereas if data is "0", it is turned off.

While the antenna switch is on, the antenna is terminated by the antenna load, whereas while the antenna switch is off, the antenna becomes open. This operation behaves to terminate during on-state and reflect during off-state, with respect to radio waves arriving from a transfer destination. It is therefore possible for the transfer destination to read transmission data by detecting reflection of the transmission radio wave. More specifically, image data is basically transmitted, through a back scattering scheme, as reflected radio waves of radio waves from the transfer destination generated by a change in an antenna load impedance to be caused by the on/off operation of the antenna switch.

The wireless transmission module unit may be provided further with a band pass filter and ASK detection unit for receiving and processing an external control signal made of ASK modulation waves. These two blocks are used when an ASK-modulated transmittal confirmation signal is received from a transfer destination, and are not necessary for one-way transmission not performing transmittal confirmation of transmission. In an RFID back scattering communication scheme, a PSK or FSK modulation scheme may be adopted in addition to an ASK modulation.

The antenna switch is generally made of a gallium arsenide IC, and its consumption power is several 10 µW or less. Therefore, the above-described communication scheme can realize ultra low consumption image transmission.

The band pass filter is used in order to pass frequencies in a predetermined frequency band and attenuate frequencies in other frequency bands. The ASK detection unit necessary for transmittal confirmation can realize a consumption power of 30 mW or less.

Therefore, as an average power of data transmission by the wireless communication system of the present invention, it is possible to transmit with a power of 10 mW or less for the transmittal confirmation scheme and a power of several 10 µW for the one-way transmission. This presents an overwhelming performance difference as compared to an average consumption power of a general wireless LAN.

Advantageous Effect of the Invention

According to the present invention, it is possible to provide an excellent wireless communication system and wireless communication apparatus capable of realizing a low consumption power for wireless transmission of image data or the like from a portable apparatus such as a digital camera and a mobile phone to an apparatus such as a PC, a television and a printer.

According to the present invention, it is possible to provide an excellent wireless communication system and wireless communication apparatus capable of realizing a low consumption power in a communication type that a ratio of transmission between apparatus limited to a relatively short distance occupies most of communications.

According to the present invention, extremely ultra low consumption power image transmission compared to a wireless LAN can be realized by a mobile apparatus. It is therefore possible to increase considerably a battery lifetime of a mobile apparatus.

Further, according to the present invention, a wireless transmission module of a mobile apparatus as a data transmission side can be realized easily at a lower cost as compared to a wireless LAN. Furthermore, a wireless transmission module on a mobile side is not a subject of a wireless station in the context of the Radio Law, so that an authorization work such as conformity certification is not necessary.

Other objects, features and advantages of the present invention will become apparent from detailed description of embodiments of the present invention to be described later and accompanying drawings.

BEST MODE FOR CARRYING OUT THE INVENTION

In the following, embodiments of the present invention will be described in detail with reference to the accompanying drawings.

The present invention aims to realize a low consumption power in a communication type that a ratio of transmission between apparatus limited to a relatively short distance occupies most of communications, and wireless communication is conducted by utilizing reflected waves on the basis of a back scattering scheme used in RFID.

An RFID system itself is widely known in the art as an example of wireless communication means capable of being applied only in a local area.

RFID is a system constituted of a tag and a reader in which information stored in the tag is read with the reader in a non-contact manner. Although there are other names for the system including "ID system, data carrier system" and the like, the RFID system is commonly used worldwide. In some cases, abbreviated RFID is also used. Japanese translation is "Recognition System Using High Frequency (Wireless) Waves". The RFID tag is a device containing unique identification information and has the operation characteristics that a radio wave having a modulation frequency corresponding to the identification information is oscillated in response to a reception of a radio wave having a specific frequency, and a reader device side can identify what it is in accordance with an oscillation frequency of the RFID tag. The communication methods between the tag and a reader/writer includes a magnetic coupling scheme, a magnetic induction scheme, a radio wave communication scheme and the like. The present invention is associated with a radio communication scheme using microwaves in a 2.4 GHz band among those schemes (to be described later).

FIG. 1 schematically shows the hardware structure of a wireless communication apparatus 300 according to an embodiment of the present invention. The wireless communication apparatus 300 shown in FIG. 1 corresponds to an apparatus which is a transmission source of image data, such as a digital camera and a mobile phone with a camera, and is driven by a main power source such as a battery (not shown).

A camera unit 302, a signal processing unit 303, a memory card interface unit 304, an operation/display unit 305 and a USB interface unit 306 are realized by generally the same structures as those of the functional modules represented by reference numerals 202 to 206 of the conventional digital camera with the wireless LAN function module shown in FIG. 6i, and the description thereof is omitted herein.

The wireless communication apparatus of the embodiment is characterized in that an RFID tag on the basis of a radio wave communication scheme is used as a wireless transmission module 308 in place of the wireless LAN module 201.

The wireless transmission module 308 is constituted of an antenna 309, an antenna switch 310, an antenna load 311, a band pass filer 312 and an ASK detection unit 313. In the embodiment, a 2.4 GHz band is used as the frequency of a radio wave.

When an image transfer is performed, upon reception of image data read from the memory card 307 by the signal processing unit 303, the wireless transmission module 308 performs an on/off operation of the antenna switch 310 connected to the antenna 309 in accordance with a bit image of data. For example, if data is "1", the antenna switch 310 is turned on, whereas if data is "0", it is turned off.

As shown in the figure, while the antenna switch 310 is on, the antenna 309 is terminated by an antenna load 311 of 50Ω, whereas while the antenna switch 310 is off, the antenna 309 becomes open. This operation behaves to terminate during on-state and reflect during off-state, relative to a radio wave arriving from a transfer destination (to be described later). It is therefore possible for the transfer destination to read image data by detecting reflection of the transmission radio wave. More specifically, image data is basically transmitted as reflected radio waves of radio waves from the transfer destination generated by a change in an antenna load impedance to be caused by the on/off operation of the antenna switch 310. The communication scheme of this type is called a "back scattering scheme". A reflected wave signal from the wireless transmission module 308 is equivalent to an ASK modulation wave. However, in the RFID back scattering communication scheme, a PSK or FSK modulation scheme may be adopted in addition to the ASK modulation.

The antenna switch 310 is generally constituted of an IC of gallium arsenide, and its consumption power is several 10 μW or less. Therefore, with the above-described communication scheme, wireless image transmission can be realized at ultra low consumption.

The band pass filter 312 and ASK detection unit 313 are used when an ASK modulated transmittal confirmation signal is received from the transfer destination. These two blocks are not necessary for one-way transmission not performing transmittal confirmation of transmission. On the other hand, if transmittal confirmation is to be performed, this control is executed by the signal processing unit 303.

The band pass filter 312 is used in order to pass frequencies in the 2.4 GHz band and attenuate frequencies in other frequency bands. The ASK detection unit 313 necessary for transmittal confirmation can realize a consumption power of 30 mW or less.

Therefore, an average power of data transmission of image data or the like performed by the wireless communication apparatus shown in FIG. 1 is 10 mW or less for the transmittal confirmation scheme and several 10 μW for the one-way transmission. This presents an overwhelming performance difference as compared to an average consumption power of a general wireless LAN.

FIG. 2 schematically shows the hardware structure of a wireless communication apparatus for receiving transmission data from the wireless communication apparatus shown in FIG. 1, according to the embodiment. The wireless communication apparatus shown in the figure corresponds to an image reproducing apparatus such as a PC and a television for displaying and outputting received image data, and a printer for printing and outputting.

In this embodiment, since image data is transmitted as reflected waves, it is necessary for a wireless reception module 400 to transmit a non-modulated carrier to generate reflected waves. The wireless reception module 400 is constituted of an antenna 401 in the 2.4 GHz band, a circulator 402, a reception unit 403, a transmission unit 406, a frequency synthesizer 409, a communication control unit 410 and a host interface unit 411. The reception unit 403 is constituted of an orthogonal detection unit 404 and an AGC amplifier unit 405, and the transmission unit 406 is constituted of a mixer 408 and a power amplifier 407. The host interface unit 411 is connected to a host apparatus 412 such as a PC, and transfers received image data.

Transmission of a non-modulated carrier from the wireless reception module 400 is realized by applying a certain d.c. voltage to the mixer 408 from the communication control unit 410. A frequency of the non-modulated carrier to be transmitted is determined by a frequency of the frequency synthesizer under control of the communication control unit 410. In this embodiment, the 2.4 GHz band is used. The non-modulated carrier output from the mixer 408 is amplified by the power amplifier 407 to a predetermined level and transmitted from the antenna 401 via the circulator 402.

A frequency of reflected waves from the image transmission apparatus 300 is the same as the transmission frequency from the wireless reception module 400 (described above). The reflected waves are received at the antenna 401, and input to the reception unit 403 via the circulator 402. Since a local frequency same as that of transmission is input to the orthogonal detection unit 404, an ASK modulation wave multiplied by the image transmission apparatus 300 appears as an output of the orthogonal detection unit 404. However, since the received signal has a different local phase from that of the received signal, a modulation signal corresponding to the phase difference appears as an I-axis signal and a Q-axis signal.

The AGC amplifier unit 405 has a gain controlled to an optimum value, and its output signal is passed to the communication control unit 410. The communication control unit 410 demodulates the I-axis and Q-axis signals into digital data, and the correct data is transferred to the host apparatus 412 via the host interface unit 411.

If transmittal confirmation of data from the image transmission apparatus 300 is to be performed, the communication control unit 410 transfers, to the mixer 408 to make ASK modulation, digital data of an positive response ACK (Acknowledgement) if the received packet data is correct or digital data of a negative response NAK (Negative Acknowledgement) if it is incorrect. Whether data is correct or incorrect is judged from a CRC (Cyclic Redundancy Check) code added to an image data packet.

FIG. 3 shows a control sequence for wireless transmission between the wireless communication apparatus 300 shown in FIG. 1 as an image transmission apparatus and the wireless communication apparatus 400 shown in FIG. 2 as an image display apparatus. In the example shown in FIG. 3, however, it is assumed both the apparatus make transmittal confirmation. This control sequence will be described below.

(Step 1)
In the image transmission apparatus, a data transmission mode is set manually.

(Step 2)
Similarly, in the image display apparatus, a data reception wait mode is set manually.

(Step 3)
The image display apparatus transmits a non-modulated carrier.

(Step 4)
Upon reception of the non-modulated carrier, the image transmission apparatus issues a data transmission request by using reflected waves.

(Step 5)
Upon reception of the data transmission request, the image display apparatus transmits transmission permission through ASK modulation.

(Step 6)
The image display apparatus transmits a non-modulated carrier.

(Step 7)
Upon reception of the non-modulated carrier, the image transmission apparatus transmits packet zed data by using reflected waves.

(Step 8)
The image display apparatus sends the positive response ACK (Acknowledgement) through ASK modulation if the received packet data is correct. If incorrect, the negative response NAK (Negative Acknowledgement) is transmitted. Whether data is correct or incorrect can be judged from the CRC (Cyclic Redundancy Check) code added to a data packet.

When the image display apparatus transmits the ACK or NAK transmittal confirmation signal, a command for the image transmission apparatus may be contained in the same transmittal confirmation signal. For example, it may be considered that the image display apparatus issues a request of a slide show to the image transmission apparatus. It is therefore possible for the image display apparatus to control remotely the image transmission apparatus.

Thereafter, until the end of data, the processes at Step 6 to Step 8 are executed repetitively.

In the embodiment described above, since image transfer is used, two-way communications are used for data transmittal confirmation. If streaming data of a video camera or the like is to be transferred, one-way transmission may be performed. In this case, since an ASK modulated transmittal confirmation signal of the image display apparatus is not necessary, the image transmission apparatus side is not required to receive the signal, realizing further low consumption power.

In the example shown in FIG. 1, although the wireless transmission module 308 is built in a photographing apparatus such as a digital camera on the image transmission apparatus side, obviously the gist of the present invention is not limited thereto. The wireless transmission module may be an external adaptor or the like in the form of external connection to the apparatus main body, in conformity with USB and other interface standards.

FIG. 4 schematically shows an example of the structure that a wireless transmission module of an adapter type is used.

As shown in the figure, an image transmission apparatus has a camera unit 602, a signal processing unit 603, a memory card interface unit 604, an operation/display unit 605, a USB interface unit 606 and a memory card 607. These components may be generally the same as the components of the conventional digital camera having the wireless LAN function shown in FIG. 6 and represented by reference numerals 202 to 207.

Generally, the USB interface unit 606 operates as a slave and is used when the signal processing unit 603 transfers objective image data read from the memory card 607 via the memory card interface unit 604, via a USB cable to PC as a USB host. In the embodiment shown in FIG. 4, the USB Interface operates being switched to a host and is connected to a wireless transmission module 601 of an external slave side apparatus connected to a USB, so that an apparatus equivalent to that shown in FIG. 1 can be configured.

The wireless transmission module 601 can be considered as an adapter having an outer appearance such as represented by reference numeral 620 having a USB connector and an antenna 609.

The wireless transmission module 601 shown in FIG. 4 is generally the same as the wireless transmission module 308 shown in FIG. 1 excepting that a USB interface unit 614 is added. The wireless transmission module has an antenna 609, an antenna switch 610, an antenna load 611, a band pass filter 612 and an ASK detection unit 613.

When an image transfer is performed, in the wireless transmission module 601, a communication control unit 608 receives image data read from the memory card 607 by the signal processing unit 603, via the host side USB interface unit 606 and the slave side USB interface unit 614. In accordance with a bit series of the data, an on/off control is performed for the antenna switch 610 connected to the antenna 609. For example, the antenna switch 610 is turned on if data is "1" and it is turned off if data is "0". During on-state, the antenna 609 is terminated by the antenna load 611 of 50Ω, while during off-state, the antenna 609 becomes open. With this operation, the wireless transmission module 601 behaves to terminate during on-state and reflect during off-state, with respect to radio waves arriving from the transfer destination.

The band pass filter 612 and the ASK detection unit 613 are used when an ASK modulated transmittal confirmation signal is received from the transfer destination. These two blocks are not necessary for one-way transmission not performing transmittal confirmation of transmission. Control of transmittal confirmation is executed by the communication control unit 608. The band pass filter 612 is used in order to pass frequencies in the 2.4 GHz band and attenuate frequencies in other frequency bands.

Even the structure shown in FIG. 4 can realize image transmission of ultra low consumption, similar to the apparatus structure shown in FIG. 1. Under accelerated compactness of a mobile apparatus main body, it is considered that the wireless transmission module of the adaptor type of this embodiment is particularly effective. In the embodiment, although USB is used as a connection interface to an apparatus main body such as a digital camera, it is obvious that other interfaces may also be used.

A reflected wave transmission system generally adopts a modulation scheme having a relatively low bit rate, such as ASK (Amplitude Shift Keying). For example, BPSK modulation can be realized easily by controlling a load impedance of a directional antenna on a reflector side to dispose "0" and "1" signals in a signal space, for example, by an on/off operation of antenna termination. However, these modulation schemes are associated with a problem in terms of a transmission rate. In contrast, for example, by providing a plurality of reflection paths having different phase differences to switch the reflection paths in accordance with transmission data, it is possible to realize a phase modulation scheme having a higher bit rate, such as BPSK, QPSK and eight-phase PSK modulations.

The present invention has been described in detail with reference to the particular embodiments. However, it is obvious that modifications and substitutions of the embodiments can be made by those skilled in the art without departing from the gist of the present invention. More specifically, the present invention has been disclosed illustratively, and the description contents of the specification should not be construed limitatively. In order to determine the gist of the present invention, the scope of claims should be taken into consideration.

INDUSTRIAL APPLICATION FIELD

According to the present invention, a low consumption power can be realized for wireless transmission of image data or the like from a portable apparatus such as a digital camera and a mobile phone to an apparatus such as a PC, a television and a printer.

Further, according to the present invention, a low consumption power can be realized in a communication type that a ratio of transmission between apparatus limited to a relatively short distance occupies most of communications.

According to the present invention, extremely ultra low consumption power image transmission compared to a wireless LAN can be realized by a mobile apparatus. It is therefore possible to increase considerably a battery lifetime of a mobile apparatus.

Further, according to the present invention, a wireless transmission module of a mobile apparatus as a data transmission side can be realized easily at a low cost as compared to a wireless LAN. Furthermore, a wireless transmission module on a mobile side is not a subject of a wireless station in the context of the Radio Law, so that an authorization work such as conformity certification is not necessary.

DESCRIPTION OF REFERENCE NUMERALS

Figure 1:
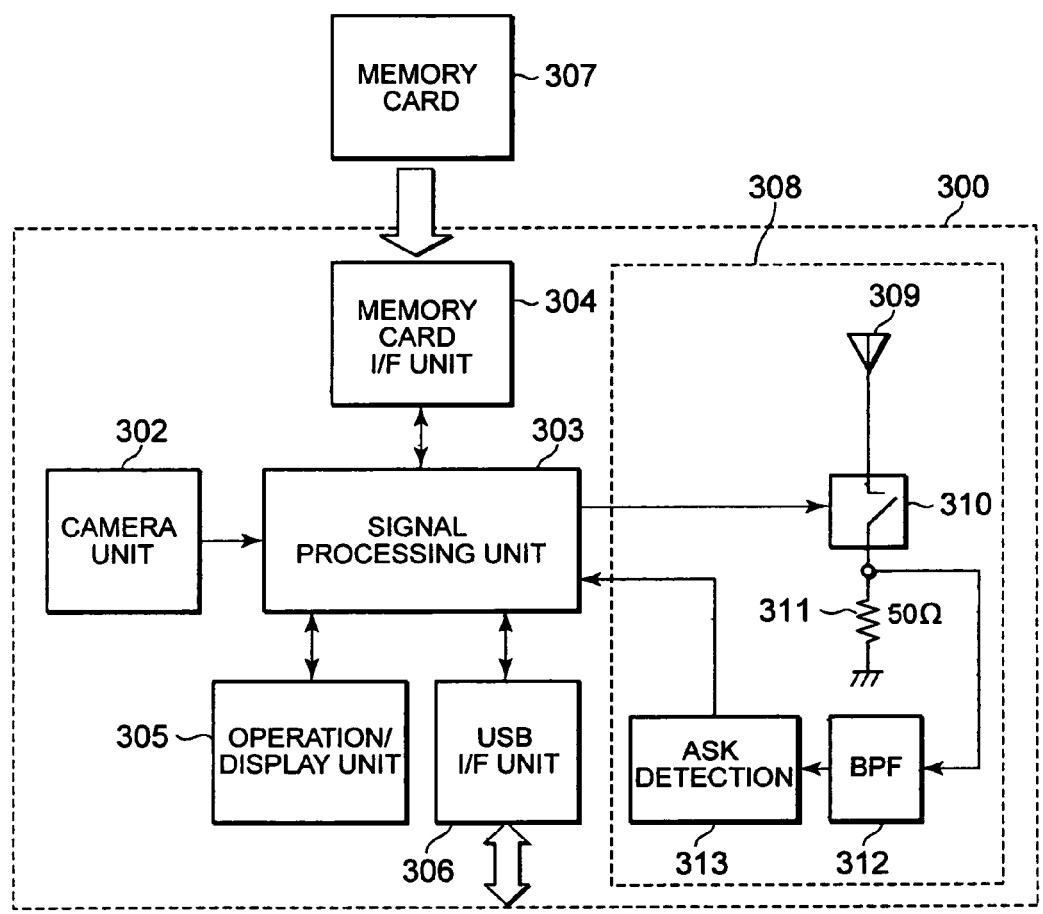
FIG. 1 is a schematic diagram showing the hardware structure of a wireless communication apparatus 300 according to an embodiment of the present invention.
Figure 2:
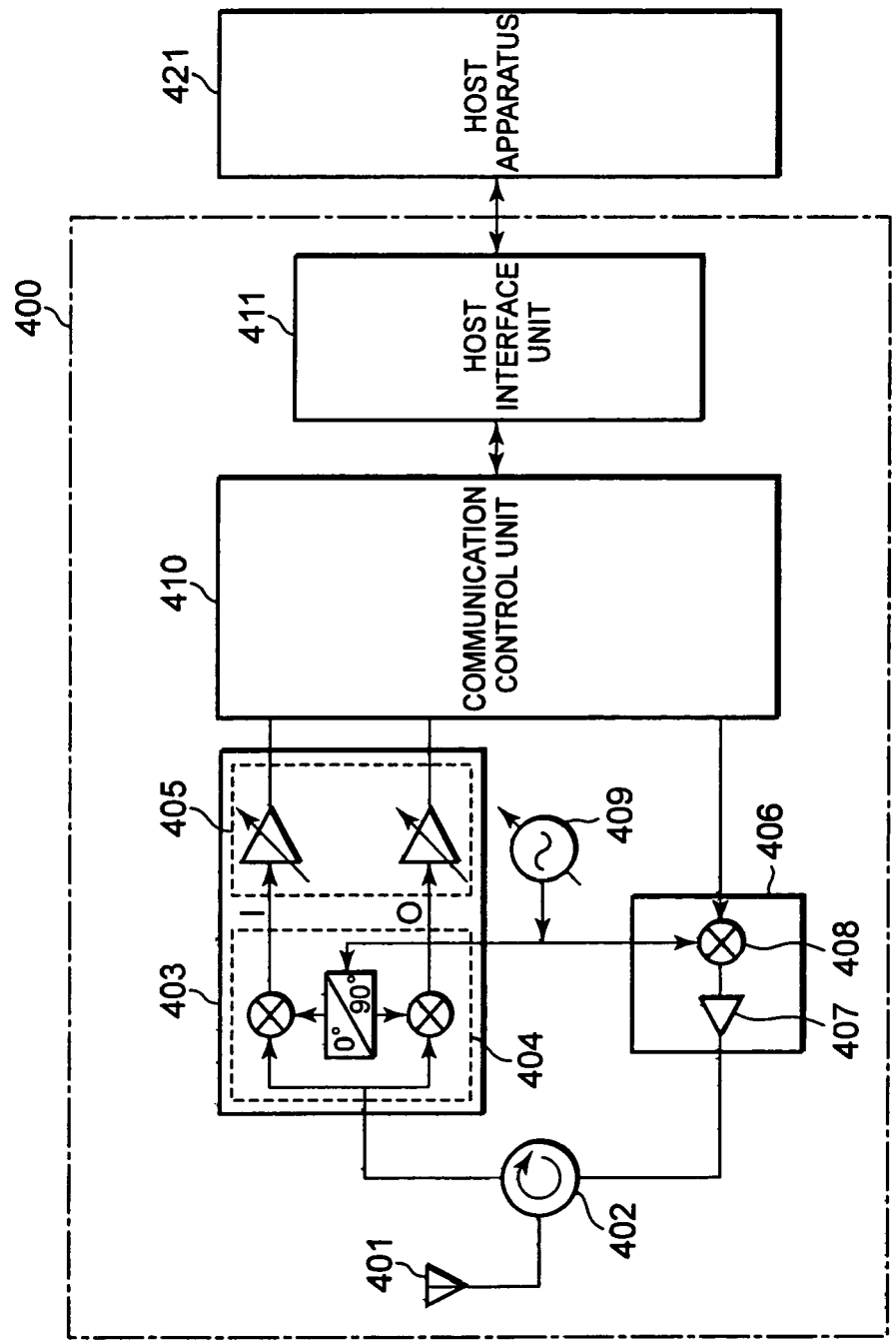
FIG. 2 is a schematic diagram showing the hardware structure of a wireless communication apparatus for receiving transmission data from the wireless communication apparatus shown in FIG. 1.
Figure 3:
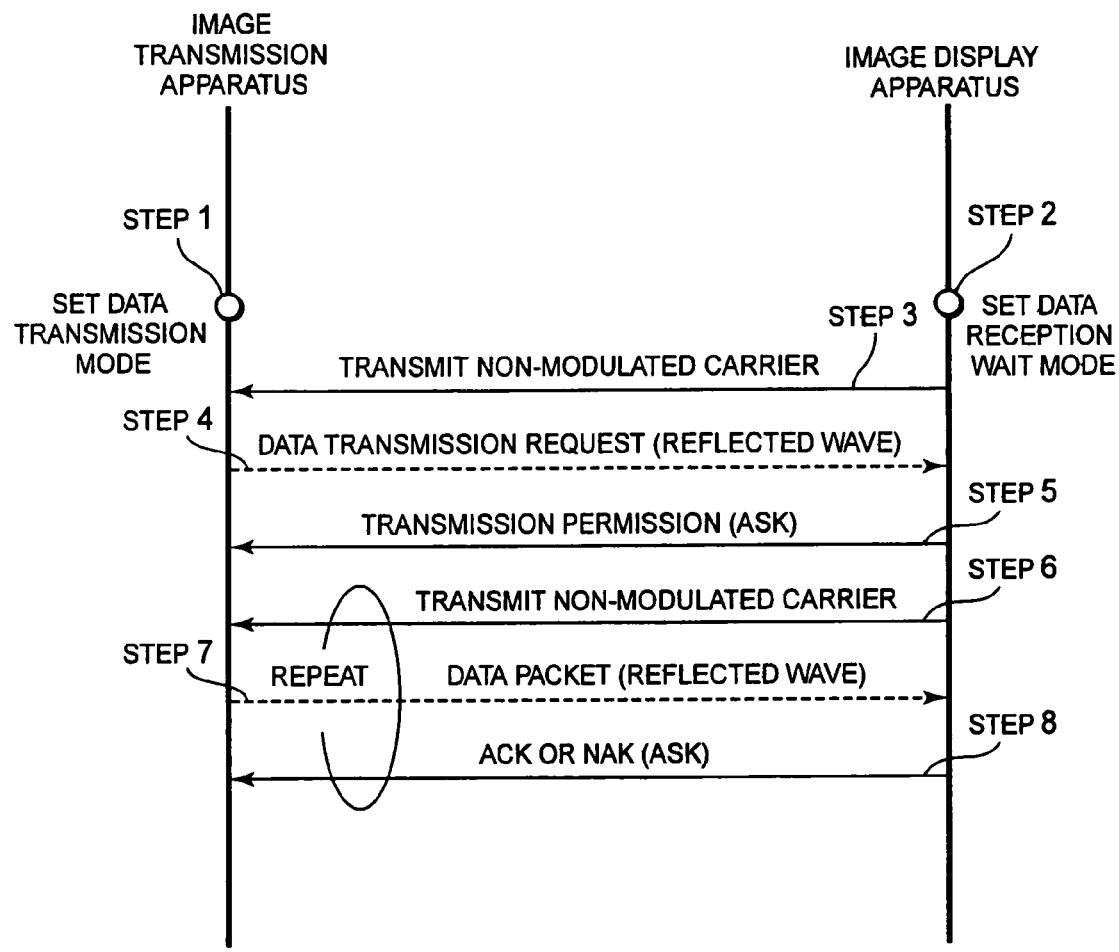
FIG. 3 is a diagram showing a control sequence for wireless transmission between the wireless communication apparatus 300 shown in FIG. 1 and the wireless communication apparatus 400 shown in FIG. 2.
Figure 4:
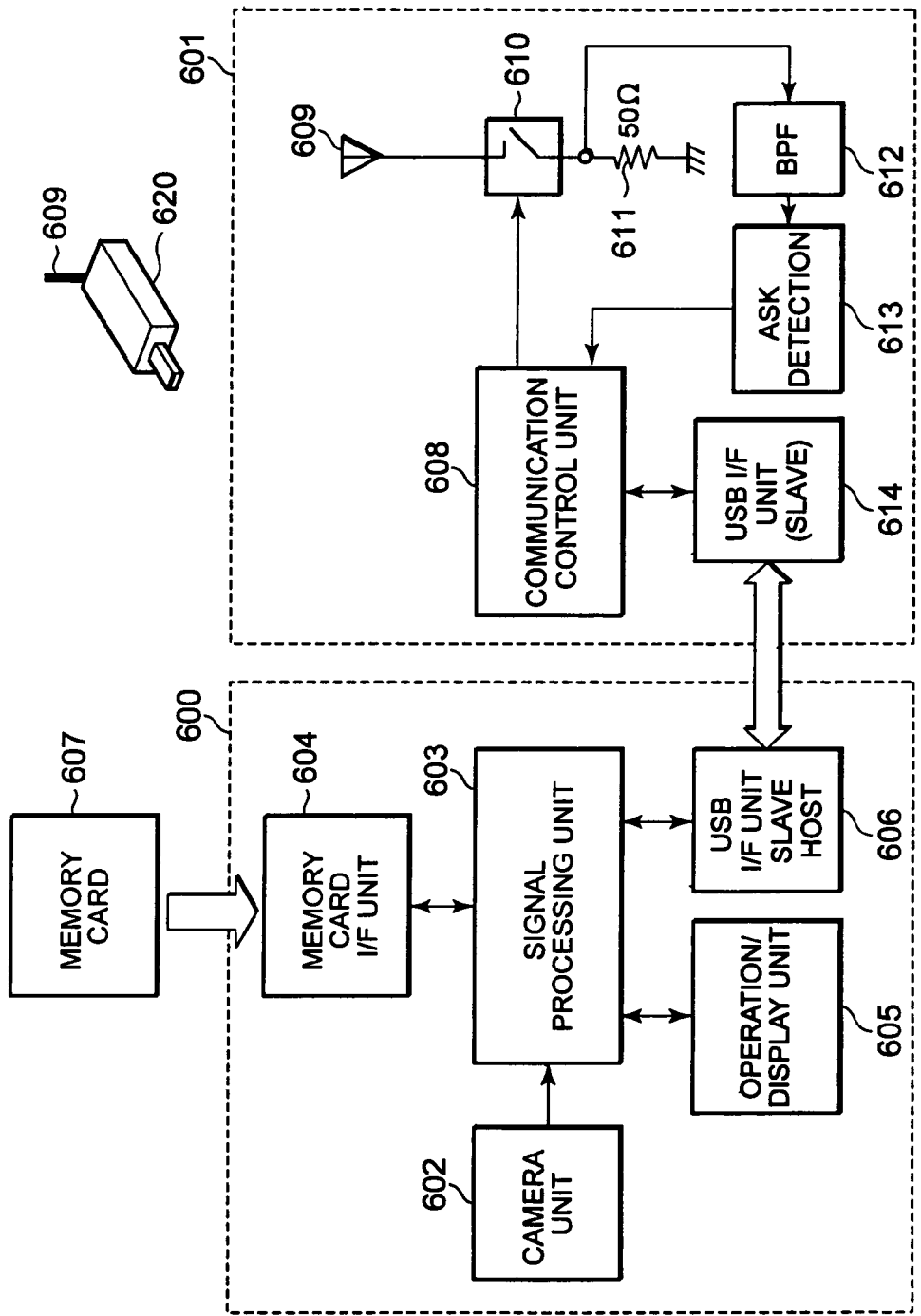
FIG. 4 is a schematic diagram showing an example of the structure of a wireless transmission module configured as adaptor type.
Figure 5:
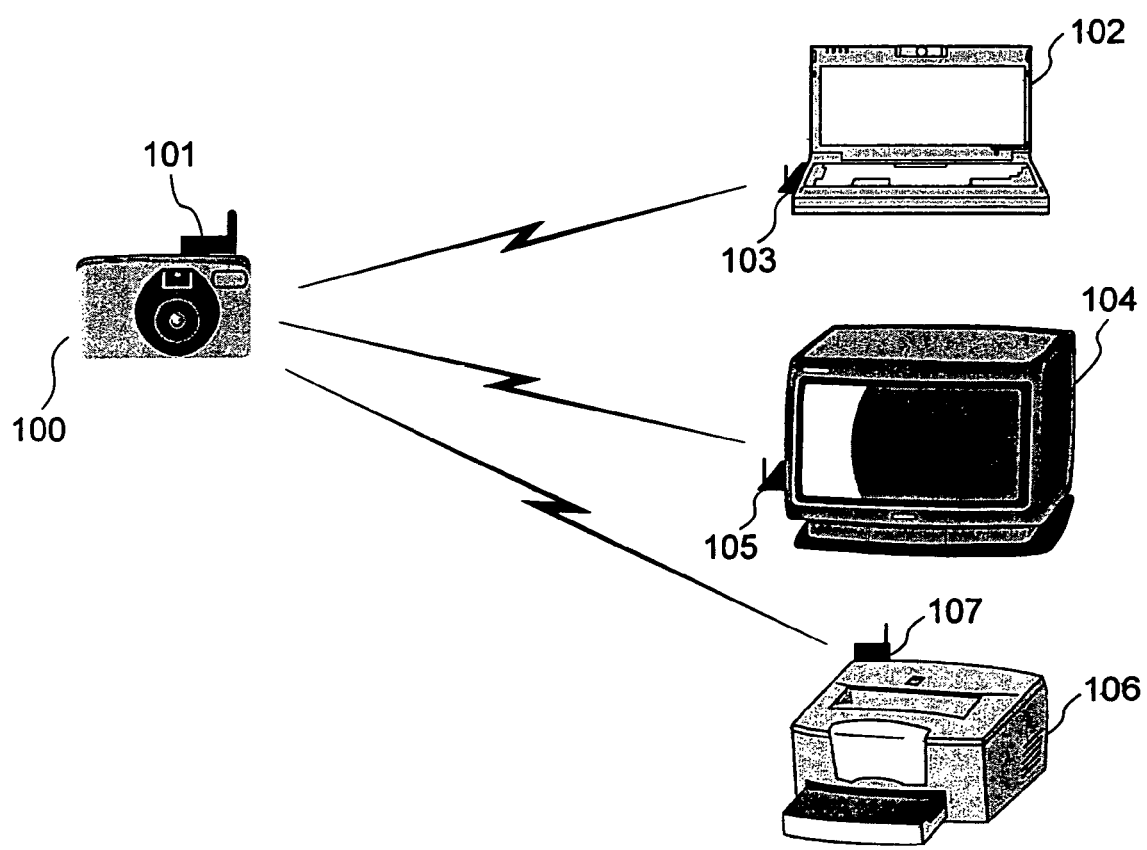
FIG. 5 is a diagram illustrating an example of image transmission by a conventional wireless LAN.
Figure 6:
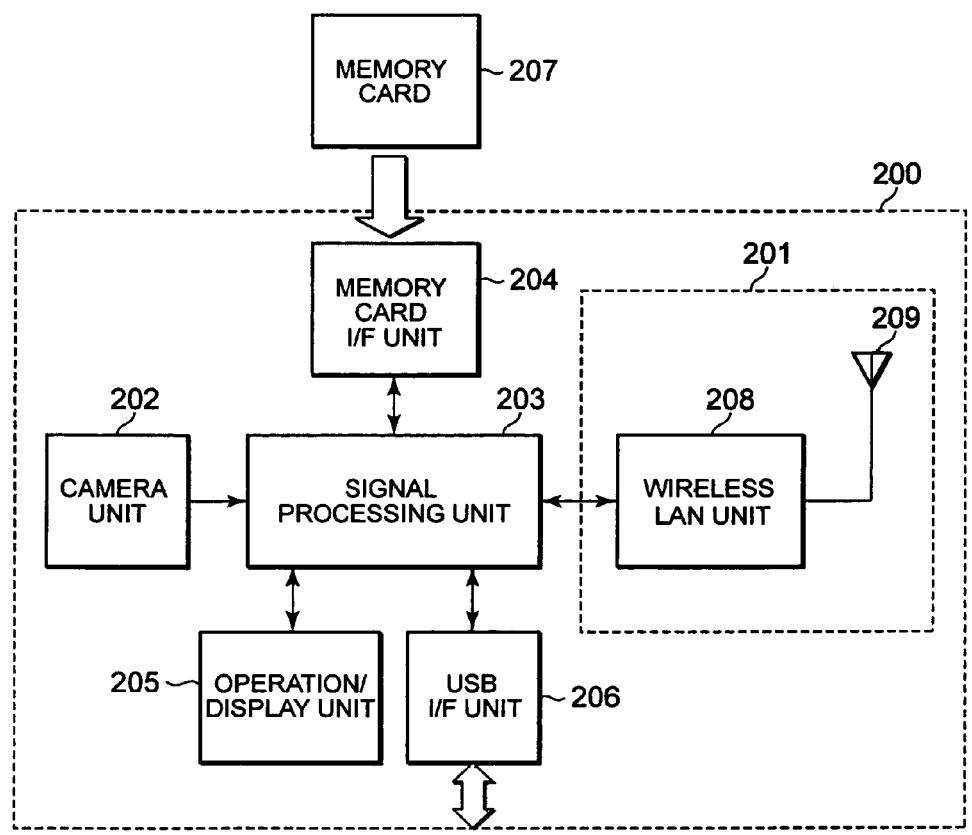
FIG. 6 schematically shows the structure of a conventional digital camera having a wireless LAN function.

300 . . . wireless communication apparatus,
302, 602 . . . camera unit,
303, 603 . . . signal processing unit,
304, 604 . . . memory card interface unit,
305 . . . operation/display unit,
306, 606 . . . USB interface unit,
307, 607 . . . memory card,
308 . . . wireless transmission module,
309, 609 . . . antenna,
310, 610 . . . antenna switch,
311, 611 . . . antenna load,
312, 612 . . . band pass filter,
313, 613 . . . ASK detection unit,
400 . . . wireless reception module,
401 . . . antenna,
402 . . . circulator,
403 . . . reception unit,
404 . . . orthogonal detection unit,
405 . . . AGC amplifier,
406 . . . transmission unit,
407 . . . power amplifier,
408 . . . mixer,
409 . . . frequency synthesizer,
410 . . . communication control unit,
411 . . . host interface unit,
412 . . . host apparatus,
614 . . . USB interface unit

The invention claimed is:

1. A wireless communication system for data transmission by radio waves between a data supply source apparatus and a data provided destination apparatus, in which:

the data supply source apparatus is operable to photograph a moving image and to perform an RFID (Radio Frequency Identification) tag function that transmits image data representative of the moving image obtained from a moving image photographing operation by a back scattering scheme by absorbing or reflecting external radio waves provided by the data provided destination apparatus in accordance with a bit string of the data through an on/off control of an antenna switch to make an antenna in a terminated state or an open state; and the data provided destination apparatus is operable to perform a reader function that transmits the radio waves in a predetermined frequency band and reads data of an RFID tag in accordance with reflected waves from the data supply source apparatus which represent the moving image data obtained from the moving image photographing operation, in which the wireless communication system includes a circuit to provide confirmation as to whether the image data supplied from the data supply source apparatus is correct or incorrect, in which the wireless communication system is operable to perform in a first mode and a second mode, in which in the first mode the image data along with the confirmation thereof is transmitted and in the second mode one-way transmission of the image data without the confirmation thereof is transmitted, in which an average power utilized by the wireless communication system for transmission of the image data and the confirmation thereof is 10 mW (milliwatts) or less, and in which an average power utilized by the wireless communication system for the one-way transmission of the image data without confirmation thereof is approximately several 10 μW (microwatts) or less.

2. The wireless communication system recited in claim 1, in which:

the data provided destination apparatus transmits a non-modulated carrier or a modulated control signal, and the data supply source apparatus transmits data by absorbing or reflecting the external radio waves on a basis of termination control of the antenna; and the data provided destination apparatus receives the data on a basis of presence/absence of the reflected waves from the supply source apparatus.

3. The wireless communication system recited in claim 1, in which:

the data provided destination apparatus has means for storing or reproducing data received from the data supply source apparatus.

4. The wireless communication system recited in claim 1, in which:

the data provided destination apparatus receives the data on a basis of presence/absence of the reflected waves from the supply source apparatus, performs error detection, and transmits an error detection result in a form of a control signal made of an ASK, PSK or FSK modulation wave, and the data supply source apparatus demodulates the control signal at a reception unit and demodulation unit to perform re-transmission control.

5. The wireless communication system recited in claim 1, in which:

the data supply source apparatus having photographing means is remotely controlled by a command in a control signal transmitted from the data provided destination apparatus.

6. The wireless communication system recited in claim 1, in which the data supply source apparatus is a digital camera or a mobile phone.

7. The wireless communication system recited in claim 1, in which the data provided destination apparatus is a personal computer, a television, or a printer.

8. The wireless communication system recited in claim 1, in which the image data is transmitted by the data supply source apparatus at a frequency of approximately 2.4 GHz.

* * * * *